United States Patent
Sebire et al.

(10) Patent No.: US 9,949,159 B2
(45) Date of Patent: Apr. 17, 2018

(54) GUARANTEED PERIODS OF INACTIVITY FOR NETWORK LISTENING MODES

(71) Applicant: Nokia Solutions and Networks Oy, Espoo (FI)

(72) Inventors: Benoist Pierre Sebire, Tokyo (JP); Klaus Ingemann Pedersen, Aalborg (DK)

(73) Assignee: Nokia Solutions and Networks Oy, Espoo (FI)

( * ) Notice: Subject to any disclaimer, the term of this patent is extended or adjusted under 35 U.S.C. 154(b) by 31 days.

(21) Appl. No.: 14/779,184

(22) PCT Filed: Mar. 22, 2013

(86) PCT No.: PCT/EP2013/056117
§ 371 (c)(1),
(2) Date: Sep. 22, 2015

(87) PCT Pub. No.: WO2014/146725
PCT Pub. Date: Sep. 25, 2014

(65) Prior Publication Data
US 2016/0057644 A1    Feb. 25, 2016

(51) Int. Cl.
*H04W 24/10* (2009.01)
*H04W 74/08* (2009.01)
(Continued)

(52) U.S. Cl.
CPC .......... *H04W 24/10* (2013.01); *H04L 47/27* (2013.01); *H04W 24/02* (2013.01);
(Continued)

(58) Field of Classification Search
CPC . H04W 24/02; H04W 24/10; H04W 74/0833; H04L 47/27
See application file for complete search history.

(56) References Cited

U.S. PATENT DOCUMENTS

2009/0316585 A1* 12/2009 Srinivasan ............ H04W 24/02 370/241
2011/0034165 A1*  2/2011 Hsu ................... H04W 36/0088 455/423

(Continued)

FOREIGN PATENT DOCUMENTS

EP    2 547 137 A1    1/2013

OTHER PUBLICATIONS

"TP on additional editorial changes on use of ENUMERATED: Attachment to R2-086538 (Miscellaneous Editorial corrections on RRC)"—Alcatel-Lucent, 3GPP TSG-RAN WG2#64, Nov. 4, 2008.*

3GPF TSG-RAN WG2 #64, Nov. 10-14, Prague, Czech Republic, R2-086538, "Miscellaneous Editorial corrections RRC", Alcatel-Lucent, 6 pgs.

(Continued)

*Primary Examiner* — Redentor Pasia
(74) *Attorney, Agent, or Firm* — Harrington & Smith

(57) ABSTRACT

The present invention provides methods, apparatuses and computer program product relating to guaranteed periods of inactivity for network listening modes. The present invention includes configuring a measurement configuration message, the measurement configuration message including measurement gap information, and transmitting the measurement configuration message to at least two user equipments connected to the base station, wherein the measurement gap information included in the measurement configuration message is the same for each of the at least two user equipments.

15 Claims, 4 Drawing Sheets

(51) Int. Cl.
*H04L 12/807* (2013.01)
*H04W 24/02* (2009.01)
*H04W 88/06* (2009.01)
*H04W 84/08* (2009.01)
*H04W 84/04* (2009.01)

(52) U.S. Cl.
CPC ...... *H04W 74/0833* (2013.01); *H04W 84/045* (2013.01); *H04W 88/06* (2013.01)

(56) References Cited

U.S. PATENT DOCUMENTS

| | | | | |
|---|---|---|---|---|
| 2012/0113866 | A1* | 5/2012 | Tenny | H04W 24/10 370/254 |
| 2012/0238268 | A1* | 9/2012 | Radulescu | H04W 36/0061 455/435.1 |
| 2012/0252487 | A1* | 10/2012 | Siomina | H04W 24/10 455/456.1 |
| 2013/0237233 | A1* | 9/2013 | Radulescu | H04W 36/22 455/440 |
| 2013/0294412 | A1* | 11/2013 | Wang | H04W 16/14 370/331 |

OTHER PUBLICATIONS

3GPP TSG-RAN WG2 #64, Nov. 10-14, Prague, Czech Republic, Attachment to R2-086538, "TP on additional editorial changes on use of ENUMERATED: Attachment to R2-086538 (Misc. Editorial corrections on RRC)", Alcatel-Lucent, 93 pgs.

3GPP TS 36.300 V11.4.0 (Dec. 2012), "3$^{rd}$ Generation Partnership Project; Technical Specification Group Radio Access network; Evolved Universal Terrestrial Radio Access (E-UTRA) and Evolved Universal Terrestrial Radio Access network (E-UTRAN; Overall description; Stage 2 (Release 11)", 208 pgs.

3GPP TS 36.321 V11.1.0 (Dec. 2012), "3$^{rd}$ Generation Partnership Project; Technical Specification Group Radio Access network; Evolved Universal Terrestrial Radio Access (E-UTRA); Medium Access Control (MAC) protocol specification (Release 11)", 57 pgs.

3GPP TS 36.331 V11.2.0 (Dec. 2012), "3$^{rd}$ Generation Partnership Project; Technical Specification Group Radio Access Network; Evolved Universal Terrestrial Radio Access (E-UTRA); Radio Resource Control (RRC); Protocol specification (Release 11)", 340 pgs.

3GPP TR 36.922 V9.0.0 (Apr. 2010), "3$^{rd}$ Generation Partnership Project; Technical specification Group Radio Access Network; Evolved Universal Terrestrial Radio Access (E-UTRA); TDD Home eNode B (HeNB) Radio Frequency (RF) requirements analysis (Release 9)", 75 pgs.

* cited by examiner

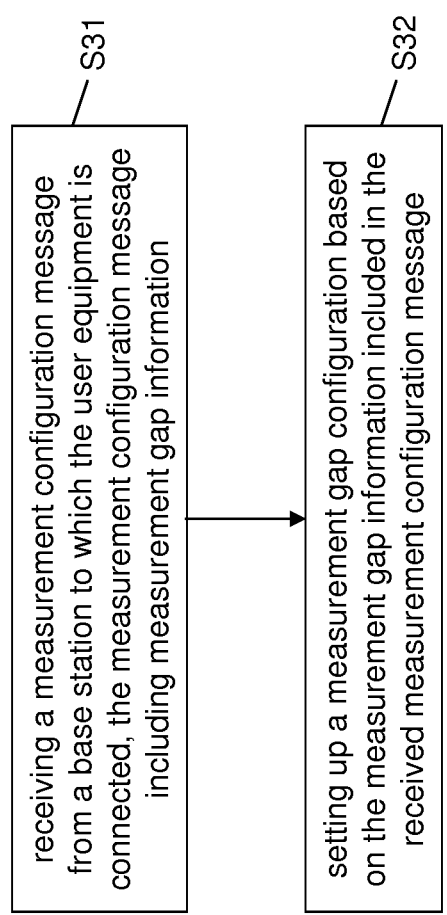

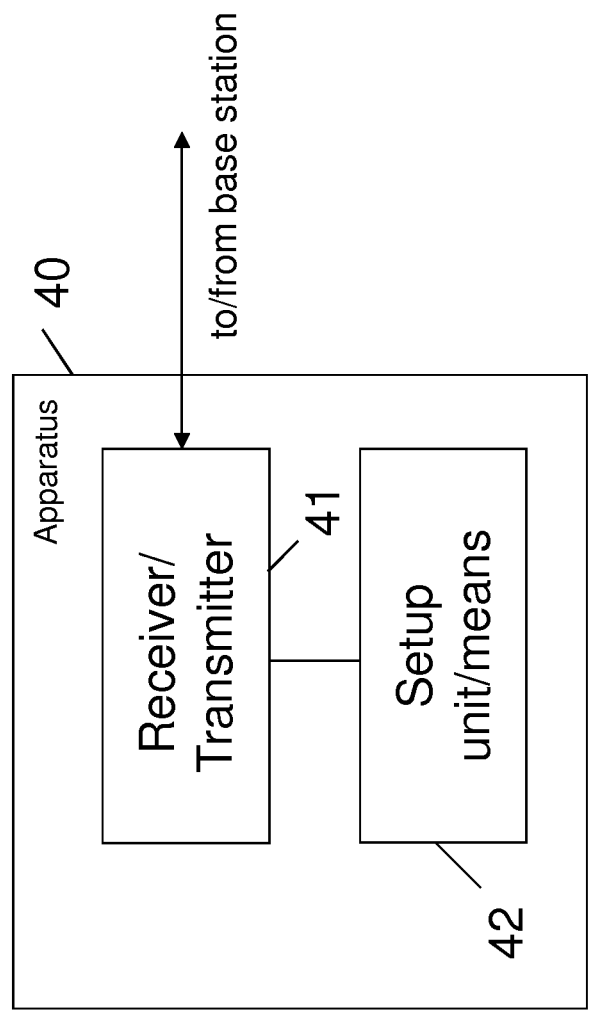

GUARANTEED PERIODS OF INACTIVITY FOR NETWORK LISTENING MODES

FIELD OF THE INVENTION

The present invention relates to guaranteed periods of inactivity for network listening modes. In particular, the present invention relates to apparatuses, methods and a program for guaranteed periods of inactivity for network listening modes.

BACKGROUND OF THE INVENTION

Network Listening Mode (NLM) is a mode of operation during which an eNB listens to the downlink transmission of other eNBs. NLM is for instance used by small cells at start up in order to select a Physical Cell Identifier (PCI) that is not currently used in the area where the small cell is located (cf., for example, §22.3.5 in document [1]). NLM allows the small cell to read the broadcast channels of surrounding cells to determine which PCI are already used locally.

A Measurement Gap (MG) allows the UE to make inter-frequency and inter-RAT measurements. With the exception of the Random Access Channel (RACH) procedure that always has priority when started, no dedicated transmission/reception (TX/RX) activity takes place in the serving cell when a measurement gap occurs. A measurement gap is always 6 ms long in downlink (DL), 7 ms long in uplink (UL), and occurs with a periodicity of 40 or 80 ms.

The eNB can only use the receiver capability for NLM during time-slots with no transmissions from the eNB. While this is not an issue when a small cell is starting and has not yet any UE to serve, it is a major issue for scenarios requiring NLM to be used while having UEs already connected.

REFERENCES

[1]: 3GPP TS 36.300, V11.4.0, December 2012
[2]: 3GPP TS 36.331, V11.2.0, December 2012
[3]: 3GPP TS 36.321, V11.1.0, December 2012

SUMMARY OF THE INVENTION

It is therefore an object of the present invention to overcome the above mentioned issues and to provide methods, apparatuses and a program for guaranteed periods of inactivity for network listening modes.

According to an aspect of the present invention there is provided a method comprising:
configuring, at a base station, a measurement configuration message, the measurement configuration message including measurement gap information, and
transmitting the measurement configuration message to at least two user equipments connected to the base station, wherein
the measurement gap information included in the measurement configuration message is the same for each of the at least two user equipments.

According to further refinements of the present invention as defined under the above aspect
the measurement gap information is included in an information element measGapConfig according to radio resource control protocol;
the measurement gap is a period during which no reception or transmission is done by the user equipment configured with the measurement gap;
the method further comprises switching, by the base station, to a network listening mode during the measurement gap;
the measurement gap is configured independent from any inter-frequency measurements;
the method further comprises increasing, by the base station, a time window for a random access response in a random access procedure.

According to another aspect of the present invention there is provided a method comprising:
receiving, at user equipment, a measurement configuration message from a base station to which the user equipment is connected, the measurement configuration message including measurement gap information, and
setting up a measurement gap configuration based on the measurement gap information included in the received measurement configuration message.

According to further refinements of the present invention as defined under the above aspect
the measurement gap information is included in an information element measGapConfig according to radio resource control protocol;
the measurement gap is a period during which no reception or transmission is done by the user equipment configured with the measurement gap;
the measurement gap is configured independent from any inter-frequency measurements.

According to another aspect of the present invention there is provided a method in a system comprising a base station and at least two user equipments connected to the base station, comprising:
configuring, at a base station, a measurement configuration message, the measurement configuration message including measurement gap information, and
transmitting the measurement configuration message to at least two user equipments connected to the base station, wherein
the measurement gap information included in the measurement configuration message is the same for each of the at least two user equipments,
receiving, at user equipment, the measurement configuration message from the base station to which the user equipment is connected, and
setting up a measurement gap configuration based on the measurement gap information included in the received measurement configuration message.

According to another aspect of the present invention there is provided an apparatus comprising:
a configuring unit adapted to configure a measurement configuration message, the measurement configuration message including measurement gap information, and
a transmitting unit adapted to transmit the measurement configuration message to at least two user equipments connected to the apparatus, wherein
the measurement gap information included in the measurement configuration message is the same for each of the at least two user equipments.

According to further refinements of the present invention as defined under the above aspect
the measurement gap information is included in an information element measGapConfig according to radio resource control protocol;
the measurement gap is a period during which no reception or transmission is done by the user equipment configured with the measurement gap;

the apparatus further comprises a switching unit adapted to switch to a network listening mode during the measurement gap;

the measurement gap is configured independent from any inter-frequency measurements;

the apparatus further comprises a unit adapted to increase a time window for a random access response in a random access procedure;

According to another aspect of the present invention there is provided an apparatus comprising:

a receiving unit adapted to receive a measurement configuration message from a base station to which the apparatus is connected, the measurement configuration message including measurement gap information, and a setup unit adapted to setup a measurement gap configuration based on the measurement gap information included in the received measurement configuration message.

According to further refinements of the present invention as defined under the above aspect the measurement gap information is included in an information element measGapConfig according to radio resource control protocol;

the measurement gap is a period during which no reception or transmission is done by the apparatus configured with the measurement gap;

the measurement gap is configured independent from any inter-frequency measurements;

According to another aspect of the present invention there is provided system comprising a base station and a user equipment as defined under any one of the above aspects.

According to another aspect of the present invention there is provided an apparatus comprising:

means for configuring a measurement configuration message, the measurement configuration message including measurement gap information, and means for transmitting the measurement configuration message to at least two user equipments connected to the apparatus, wherein the measurement gap information included in the measurement configuration message is the same for each of the at least two user equipments.

According to another aspect of the present invention there is provided an apparatus comprising:

means for receiving a measurement configuration message from a base station to which the apparatus is connected, the measurement configuration message including measurement gap information, and means for setting up a measurement gap configuration based on the measurement gap information included in the received measurement configuration message.

According to another aspect of the present invention there is provided a computer program product comprising code means adapted to produce steps of any of the methods as described above when loaded into the memory of a computer.

According to a still further aspect of the invention there is provided a computer program product as defined above, wherein the computer program product comprises a computer-readable medium on which the software code portions are stored.

According to a still further aspect of the invention there is provided a computer program product as defined above, wherein the program is directly loadable into an internal memory of the processing device.

BRIEF DESCRIPTION OF THE DRAWINGS

These and other objects, features, details and advantages will become more fully apparent from the following detailed description of aspects/embodiments of the present invention which is to be taken in conjunction with the appended drawings, in which:

FIG. 3 is a flowchart illustrating another method according to certain embodiments of the present invention.

FIG. 4 is a block diagram showing another example of an apparatus according to certain embodiments of the present invention.

DETAILED DESCRIPTION

Figure 1:
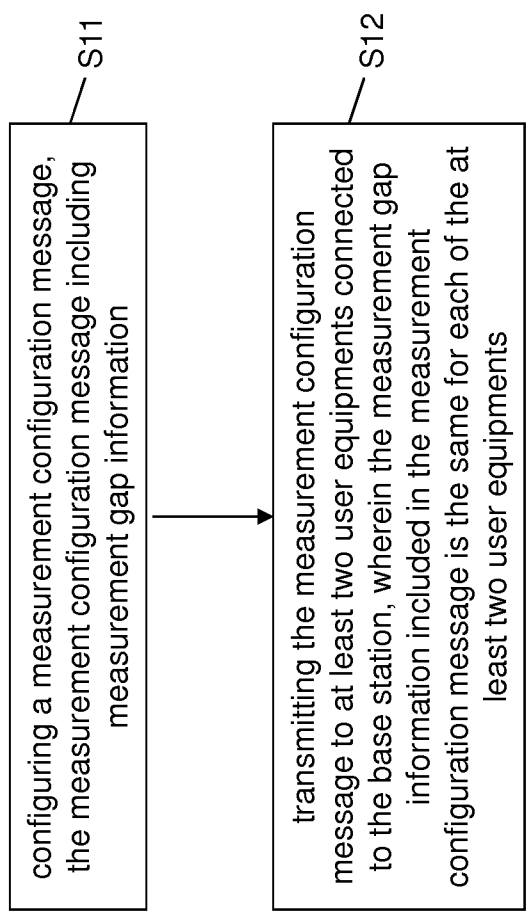
FIG. 1 is a flowchart illustrating a method according to certain embodiments of the present invention.

In the following, aspects/embodiments of the present invention are described by referring to general and specific examples of the aspects/embodiments, wherein the features of the aspects/embodiments can be freely combined with each other unless otherwise described. It is to be understood, however, that the description is given by way of example only, and that the described aspects/embodiments are by no means to be understood as limiting the present invention thereto.

The invention looks at the scenario wherein, in a cell where UEs are connected to an eNB, using the network listening mode (NLM) is problematic, as this mode requires that the eNB uses its receiver capability during time-slots when it does not transmit, as described above. When UEs are connected the opportunities to use network listening mode are reduced.

To overcome this issue, certain embodiments of the present invention propose to configure all UEs that are connected to have a common period of inactivity. By configuring the UEs with the same "gapOffset", a period of inactivity common to all UEs is then possible, allowing the eNB to then operate in network listening mode and for example receive information relating to Physical Cell Identifiers (PCIs).

In order to guarantee a common period of inactivity for all connected UEs, it is proposed to configure them with overlapping measurement gaps.

Since measurement gaps are currently configured for inter-frequency measurement, another aspect of the present invention is to allow such a configuration to take place even when no inter-frequency measurements are configured. That is, the measurement gaps may be configured independent from inter-frequency measurements.

Measurement gaps are configured by radio resource control (RRC) protocol in a dedicated manner through the Information Element (IE) measGapConfig (cf. §5.5.2.9 of document [2]), which is part of the Information Element (IE) measConfig. By configuring all UEs with the same gapOffset, included in the IE measGapConfig, RRC can therefore guarantee a period of inactivity common to all UEs, allowing the eNB to operate in NLM mode.

In this regard, it is noted that it is only necessary that the resulting measurement gap is the same for all UEs. Thus, there may be a case that even though not the same information element is sent to the UEs, the resulting measurement gap is the same for each UE.

The periods of inactivity during measurement gaps are ensured by the MAC layer (cf. document [3]) of each UE: no DL transmission is expected, no UL transmission takes place. The only exception is related to the random access procedure during which the UE expects a random access response after sending a preamble (cf. §5.1.4 of document [3]):

In particular, document [3] discloses that once the Random Access Preamble is transmitted and regardless of the possible occurrence of a measurement gap, the UE shall monitor the PDCCH of the Primary Cell (PCell) for Random Access Response(s) identified by the RA-RNTI defined below, in the RA Response window which starts at the subframe that contains the end of the preamble transmission plus three subframes and has length ra-ResponseWindow-Size subframes.

Because the eNB does not wish to transmit a random access response during the common period of inactivity used for NLM, it would have to delay it. This can easily be done by increasing the size of the RA window with the ra-ResponseWindowSize.

RRC signalling restricts the measurement configuration so that whenever the UE has a measConfig, it includes a measObject for each serving frequency. There is no other restriction that would limit the occurrence of measGapConfig to the cases where measConfig also include measObjectToAddModList for inter-frequencies. However since measurement gaps are typically configured only in the presence of inter-frequency neighbours to be measured, it should be clarified that measurements gaps may be configured independent from UE inter-frequency measurements.

In the following, a specific example of the present invention will be described with reference to the drawings.

FIG. 1 is a flowchart illustrating a method according to certain aspects of the present invention.

According to certain aspects of the present invention, the method comprises configuring, in a step S11, a measurement configuration message, the measurement configuration message including measurement gap information. Further, the method comprises transmitting, in a step S12, the measurement configuration message to at least two user equipments connected to the base station. The measurement gap information included in the measurement configuration message is the same for each of the at least two user equipments.

According to certain aspects of the present invention, the measurement gap information is included in an information element measGapConfig according to radio resource control protocol.

Further, according to certain aspects of the present invention, the measurement gap is a period during which no reception or transmission is done by the user equipment configured with the measurement gap.

According to certain aspects of the present invention the method further comprises switching, by the base station, to a network listening mode during the measurement gap.

According to certain aspects of the resent invention, the measurement gap is configured independent from any inter-frequency measurements.

According to certain aspects of the present invention the method further comprises increasing, by the base station, a time window for a random access response in a random access procedure Thus, there is guaranteed a period of inactivity common to all UEs connected to the base station so as to allow the base station to operate in a NLM mode.

Figure 2:
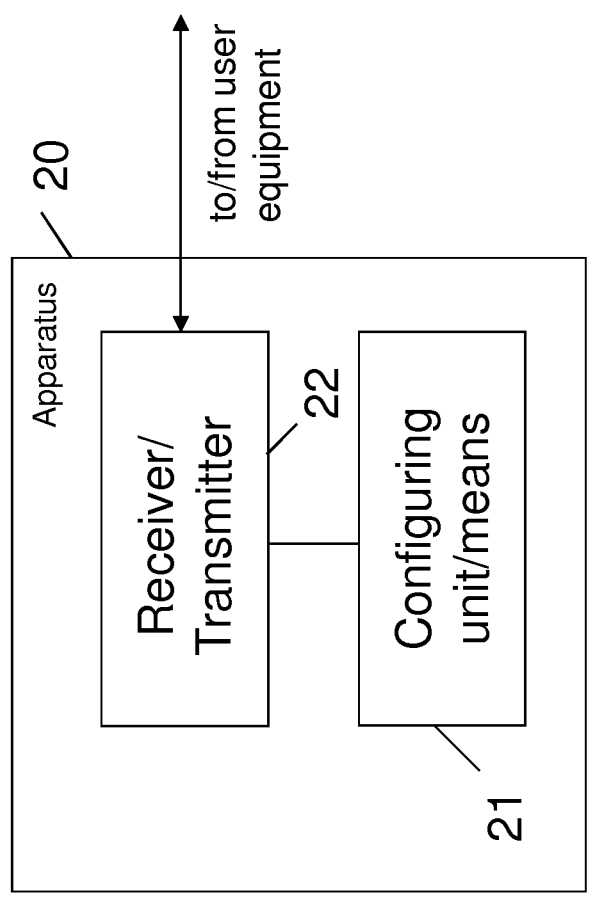
FIG. 2 is a block diagram showing an example of an apparatus according to certain embodiments of the present invention.

FIG. 2 is a block diagram showing an example of an apparatus according to certain aspects of the present invention.

According to an aspect of the present invention, the apparatus 20, e.g. a base station 20, like an eNodeB, comprises a configuring unit adapted to configure a measurement configuration message, the measurement configuration message including measurement gap information. Further, the apparatus comprises a receiver/transmitter 22 adapted to transmit the measurement configuration message to at least two user equipments connected to the base station. The measurement gap information included in the measurement configuration message is the same for each of the at least two user equipments.

For further functions of the base station according to further exemplary embodiments of the present invention, reference is made to the above description of a method according to certain embodiments of the present invention, as described in connection with FIG. 1.

FIG. 3 is a flowchart illustrating another method according to certain aspects of the present invention.

According to certain aspects of the present invention, the method comprises receiving, at a user equipment in a step S31, a measurement configuration message from a base station to which the user equipment is connected, the measurement configuration message including measurement gap information. Further, the method comprises setting up, at the user equipment in a step S32, a measurement gap configuration based on the measurement gap information included in the received measurement configuration message and that regardless of the possible configuration of UE inter-frequency measurements.

According to certain aspects of the present invention, the measurement gap information is included in an information element measGapConfig according to radio resource control protocol.

According to certain aspects of the present invention, the measurement gap is a period during which no reception or transmission is done by the user equipment configured with the measurement gap, and the measurement gap is configured independent from any inter-frequency measurements.

FIG. 4 is a block diagram showing another example of an apparatus according to certain aspects of the present invention.

According to certain aspects of the present invention, the apparatus 40, e.g. a user equipment 40 comprises a receiver/transmitter 41 adapted to receive a measurement configuration message from a base station to which the user equipment is connected, the measurement configuration message including measurement gap information. Further, the apparatus comprises a setup unit adapted to set up a measurement gap configuration based on the measurement gap information included in the received measurement configuration message.

For further functions of the apparatus, i.e. the user equipment according to further exemplary embodiments of the present invention, reference is made to the above description of a method according to certain embodiments of the present invention, as described in connection with FIG. 3.

In the foregoing exemplary description of the apparatus, only the units/means that are relevant for understanding the principles of the invention have been described using functional blocks. The apparatus may comprise further units/means that are necessary for its respective operation. However, a description of these units/means is omitted in this specification. The arrangement of the functional blocks of the apparatus is not construed to limit the invention, and the functions may be performed by one block or further split into sub-blocks.

According to further certain embodiments of the present invention, there is provided a system comprising the base station and user equipment as described above with respect to FIGS. 2 and 4.

When in the foregoing description it is stated that the apparatus (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

For the purpose of the present invention as described herein above, it should be noted that

- method steps likely to be implemented as software code portions and being run using a processor at an apparatus (as examples of devices, apparatuses and/or modules thereof, or as examples of entities including apparatuses and/or modules therefore), are software code independent and can be specified using any known or future developed programming language as long as the functionality defined by the method steps is preserved;
- generally, any method step is suitable to be implemented as software or by hardware without changing the idea of the aspects/embodiments and its modification in terms of the functionality implemented;
- method steps and/or devices, units or means likely to be implemented as hardware components at the above-defined apparatuses, or any module(s) thereof, (e.g., devices carrying out the functions of the apparatuses according to the aspects/embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;
- devices, units or means (e.g. the above-defined apparatuses, or any one of their respective units/means) can be implemented as individual devices, units or means, but this does not exclude that they are implemented in a distributed fashion throughout the system, as long as the functionality of the device, unit or means is preserved;
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

It is noted that the aspects/embodiments and general and specific examples described above are provided for illustrative purposes only and are in no way intended that the present invention is restricted thereto. Rather, it is the intention that all variations and modifications which fall within the scope of the appended claims are covered.

Abbreviations

DL Downlink
eNB E-UTRAN NodeB
MAC Medium Access Control
MG Measurement Gap
NLM Network Listening Mode
PCell Primary Cell
PCI Physical Cell Identifier
PDCCH Physical Downlink Control Channel
RACH Random Access Channel
RA-RNTI Random Access Radio Network Temporary Identifier
RAT Radio Access Technology
RNTI Radio Network Temporary Identifier
RRC Radio Resource Control
RX Reception
TX Transmission
UE User Equipment
UL Uplink

The invention claimed is:

1. A method, comprising:
configuring, at a base station, a measurement configuration message, the measurement configuration message including measurement gap information for a measurement gap;
transmitting the measurement configuration message from the base station to at least two user equipments, wherein the measurement gap information included in the measurement configuration message is the same for each of the at least two user equipments; and
switching, by the base station, to a network listening mode during the measurement gap, wherein the network listening mode allows the base station to listen to downlink transmission of other base stations and allows the base station to read broadcast channels of surrounding cells to receive information from a surrounding network.

2. The method according to claim 1, wherein the measurement gap information is included in an information element measGapConfig according to radio resource control protocol.

3. The method according to claim 1, wherein the measurement gap is a period during which no reception or transmission is done by the user equipment configured with the measurement gap.

4. The method according to claim 1, wherein the measurement gap is configured independent from any inter-frequency measurements.

5. The method according to claim 1, further comprising:
increasing, by the base station, a time window for a random access response in a random access procedure.

6. A computer program product comprising a non-transitory computer-readable medium including a program for a processing device, comprising software code portions for performing the steps of claim 1 when the program is run on the processing device.

7. An apparatus, comprising:
at least one processor,
at least one non-transitory memory comprising computer-readable code,
the memory and the computer-readable code configured, with the at least one processor, are configured to cause the apparatus to perform at least the following:
configure a measurement configuration message, the measurement configuration message including measurement gap information for a measurement gap;
transmit the measurement configuration message from the apparatus to at least two user equipments, wherein the measurement gap information included in the measurement configuration message is the same for each of the at least two user equipments;
switch to a network listening mode during the measurement gap, wherein the network listening mode allows the base station to listen to downlink transmission of other base stations and allows the base station to read broadcast channels of surrounding cells to receive information from a surrounding network.

8. The apparatus according to claim 7, wherein the measurement gap information is included in an information element measGapConfig according to radio resource control protocol.

9. The apparatus according to claim 7, wherein the measurement gap is a period during which no reception or transmission is done by the user equipment configured with the measurement gap.

10. The apparatus according to claim 7, wherein the measurement gap is configured independent from any inter-frequency measurements.

11. The apparatus according to claim 7, wherein the memory and the computer-readable code are further configured, with the at least one processor, to cause the apparatus to perform at least the following:
increase a time window for a random access response in a random access procedure.

12. An apparatus, comprising:
at least one processor,
at least one non-transitory memory comprising computer-readable code,
the memory and the computer-readable code configured, with the at least one processor, to cause the apparatus to perform at least the following:
receive, by the apparatus, a measurement configuration message from a base station, the measurement configuration message including measurement gap information for a measurement gap, wherein the base station is configured to switch to a network listening mode during the measurement gap, wherein the network listening mode allows the base station to listen to downlink transmission of other base stations and allows the base station to read broadcast channels of surrounding cells to receive information from a surrounding network, and
setup a measurement gap configuration based on the measurement gap information included in the received measurement configuration message.

13. The apparatus according to claim 12, wherein the measurement gap information is included in an information element measGapConfig according to radio resource control protocol.

14. The apparatus according to claim 12, wherein the measurement gap is a period during which no reception or transmission is done by the apparatus configured with the measurement gap.

15. The apparatus according to claim 12, wherein the measurement gap is configured independent from any inter-frequency measurements.

* * * * *